US012772083B2

(12) United States Patent
Kulkarni et al.

(10) Patent No.: US 12,772,083 B2
(45) Date of Patent: Oct. 20, 2026

(54) UNIVERSAL GRID EDGE ASSET MONITORING SYSTEMS WITH UBIQUITOUS 5G NETWORK ACCESS

(71) Applicant: Georgia Tech Research Corporation, Atlanta, GA (US)

(72) Inventors: Shreyas Kulkarni, Atlanta, GA (US); Jakob Carnemark, Atlanta, GA (US); Deepak M. Divan, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 283 days.

(21) Appl. No.: 18/691,937

(22) PCT Filed: Sep. 14, 2022

(86) PCT No.: PCT/US2022/076394
§ 371 (c)(1),
(2) Date: Mar. 14, 2024

(87) PCT Pub. No.: WO2023/044320
PCT Pub. Date: Mar. 23, 2023

(65) Prior Publication Data

US 2024/0381143 A1 Nov. 14, 2024

Related U.S. Application Data

(60) Provisional application No. 63/245,033, filed on Sep. 16, 2021.

(51) Int. Cl.
*H04W 24/08* (2009.01)
*H04W 24/02* (2009.01)
*H04W 84/18* (2009.01)

(52) U.S. Cl.
CPC ........... *H04W 24/08* (2013.01); *H04W 24/02* (2013.01); *H04W 84/18* (2013.01)

(58) Field of Classification Search
CPC ..... H04W 24/08; H04W 24/02; H04W 84/18; H02J 13/12; H02J 13/1333; H02J 13/1323

(Continued)

(56) References Cited

U.S. PATENT DOCUMENTS 10,270,490 B2 4/2019 Gross et al.
2007/0054622 A1 * 3/2007 Berkman ............... H04B 3/542 455/67.11

(Continued)

OTHER PUBLICATIONS

European Examination Report dated Jun. 17, 2025 issued in European Application No. 22870916.8. (7 Pages).

(Continued)

*Primary Examiner* — Marnie A Matt
(74) *Attorney, Agent, or Firm* — TROUTMAN PEPPER LOCKE LLP; Ryan A. Schneider; Stephanie J. Remy

(57) ABSTRACT

An exemplary embodiment of the present disclosure provides a grid edge node, comprising a power supply, one or more sensors, a telecommunications radio, and a backhaul connection. The power supply can be configured to receive input power from a power transformer mounted to a utility pole. The one or more sensors can be configured to monitor one or more conditions of the power transformer. The telecommunications radio can be configured to transmit and receive wireless telecommunications signals to and from remote devices in a telecommunications network. The backhaul connection can be configured to provide communication between the grid edge node and a cloud-based monitoring system. The grid edge node can be configured to transmit data indicative of the one or more monitored conditions to the cloud-based monitoring system via the backhaul connection. The grid edge node can be further configured to be mounted to the utility pole.

19 Claims, 3 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 2008/0100436 | A1* | 5/2008 | Banting | H02J 13/1323 340/539.22 |
| 2008/0109387 | A1* | 5/2008 | Deaver | G06Q 50/06 705/412 |
| 2009/0115427 | A1* | 5/2009 | Radtke | G01R 27/16 324/629 |
| 2011/0221603 | A1* | 9/2011 | Deaver, Sr. | G08B 25/06 340/660 |
| 2012/0054852 | A1* | 3/2012 | Gibbs | H04W 12/03 370/252 |
| 2012/0092114 | A1 | 4/2012 | Matthews | |
| 2012/0123606 | A1 | 5/2012 | Mollenkopf et al. | |
| 2017/0048598 | A1* | 2/2017 | Foster | H04Q 9/00 |
| 2017/0302511 | A1* | 10/2017 | Foster | H02J 13/1323 |
| 2018/0157231 | A1* | 6/2018 | Bogdan | H02J 13/1323 |
| 2019/0213693 | A1 | 7/2019 | Itaya | |
| 2019/0268676 | A1 | 8/2019 | Teichmann | |
| 2019/0277898 | A1* | 9/2019 | Beaudet | G01R 31/62 |
| 2020/0052482 | A1* | 2/2020 | Ostrovsky | H04L 12/2816 |
| 2020/0136010 | A1 | 4/2020 | Chen et al. | |
| 2021/0021130 | A1* | 1/2021 | Farrokhabadi | H02J 3/06 |
| 2023/0077781 | A1* | 3/2023 | Hutson | G01R 31/62 324/547 |

OTHER PUBLICATIONS

International Search Report and Written Opinion from Application No. PCT/US2022/076394 dated Dec. 15, 2022.

* cited by examiner

UNIVERSAL GRID EDGE ASSET MONITORING SYSTEMS WITH UBIQUITOUS 5G NETWORK ACCESS

CROSS-REFERENCE TO RELATED APPLICATIONS

This application claims the benefit of U.S. Provisional Application Ser. No. 63/245,033, filed on 16 Sep. 2021, which is incorporated herein by reference in its entirety as if fully set forth below.

FIELD OF THE DISCLOSURE

The various embodiments of the present disclosure relate generally to electric utility and telecommunications networks and their infrastructure, and more particularly to an intelligent grid edge system that interfaces with utility and telecommunication assets to monitor the electric grid and assets connected thereto while providing wireless communication infrastructure to the telecommunications network.

BACKGROUND

With the proliferation and rapid deployment of connected "internet of things" (IoT) devices, the telecommunication industry is moving towards $5^{th}$ generation wireless access standards, also known as 5G. Many telecom operators are heavily investing into the infrastructure, backhaul networks and access points that enable 5G networks for consumers, industries and connected devices ranging from smart phones, autonomous, self-driving cars to connected EV charging portals.

A key differentiating element between legacy networks and 5G wireless standard is the ubiquitous nature of the 5G network. The radio frequencies used for 5G networks are much higher than the legacy telecom radio networks (e.g., 3G/4G)—with the new millimeter wave (mm Wave [See, M. Jaber, M. A. Imran, R. Tafazolli and A. Tukmanov, "5G backhaul challenges and emerging re-search directions: A survey," in *IEEE Access*, vol. 4, pp. 1743-1766, 2016]) radio, the typical carrier frequency is much higher than legacy networks resulting in much higher path losses. As a result, the range between target devices and access points can be limited. With the smaller wavelengths associated with 5G carrier frequencies, the antenna elements can be miniaturized.

Thus, 5G networks compensate the path loss and coverage issue by installing multiple, distributed 5G access points dispersed throughout neighborhoods, such that the access points are always close to the target devices. This is called the 5G small cell, while the infrastructure (including access points, small cells) that enables end devices to connect to the core telecommunication network is called radio access network (RAN). They can be located on utility poles, roof-tops, or other equivalent locations.

The advantage of 5G networks is the wide coverage and high bandwidth networking provided by massively distributed and ubiquitously located RAN nodes. As telecom network operators roll out this infrastructure, it becomes imperative to locate the RAN nodes strategically to optimize overall availability and costs, due to the range limitation of 5G carrier frequencies. Building new infrastructure to mount 5G RAN nodes is expensive, relying on capital- and labor-intensive practices. Locating and providing for the power requirements of the access points can also prove to be a non-trivial effort. By way of example, if a single RAN node installation on a utility pole costs $2,000 in total and a network operator must install 1 million of these nodes across the country, the total capital expenditure involved would be ~$2 billion, which is significant. For the best use of capital resources, it is advantageous to deploy RAN nodes on existing infrastructure, rather than building new infrastructure for deploying 5G telecommunication networks.

The utility poles are shared resources among electric and telecommunication providers, with the electric utilities running the medium (MV) or high voltage (HV) electric distribution system wires on the top of the utility poles. The telecommunication providers occupy the lower sections of the utility poles, hosting telephone lines, broadband and optical fiber networks etc. [See, Florida Public Service Commission. Online [Available] http://www.psc.state.fl.us/ConsumerAssistance/UtilityPole]. For the backhaul connectivity from the 5G access point to the core network, optical fiber cables are preferred as they provide a high bandwidth and good noise immunity—up to 600× faster than mm Wave radio [See, B. Skubic et al., "Optical transport solutions for 5G fixed wireless access," in *IEEE/OSA Journal of Optical Communications and Networking*, vol. 9, no. 9, pp. D10-D18, 2017.]. Several methods to install optical fiber cables along overhead lines exist, including methods to run them along the telecommunication bundles, as well as methods to spool them on the overhead high voltage (HV) electric distribution primary cables.

Each 5G network access node typically consumes a net load of 2 $kW_{pk}$ at a very low duty cycle, typically 5-10%. As a result, they appear as pulsed loads on the electric feeder. When many 5G access nodes get deployed in the electric distribution network, together, they can appear as a significant addition on the feeder power profiles. For the electric utility, these pulsed loads can be undesirable and can lead to unintended consequences like voltage volatility and sudden peak demands.

Besides, electric utilities are facing an unprecedented change in the way distribution networks are being operated. With rapid deployment of distributed energy resources (DERs) like roof top solar (PV), electric vehicles (EVs), inverters, etc., the distribution network is experiencing major points of stress. Due to DERs with varying generation capacities, capable of injecting power back into the grid (e.g., PV+inverters) or large loads turning on simultaneously (e.g., uncoordinated EV charging), the distribution network and assets like pole top transformers, capacitor banks, load tap changers (LTCs) can experience large fluctuations in power flow, resulting in voltage volatility and overloading, ultimately leading to accelerated degradation. For instance, a pole-top distribution transformer that was designed to operate for 50+ years with traditional load profiles and cool down periods, is now experiencing a 5-10× reduction in expected life due to heavy power electronic-based downstream loads, like EV charging stations [See, R. Moghe, F. Kreikebaum, J. E. Hernandez, R. P. Kandula and D. Divan, "Mitigating distribution transformer lifetime degradation caused by grid-enabled vehicle (GEV) charging," in *Proc. IEEE Energy Conversion Congress and Exposition,* 2011, pp. 835-842.].

With the distribution network being vast and spanning millions of miles, monitoring, and reliably controlling it can be challenging—both from an operational as well as an economic point of view. The large deployment of smart meters and Advanced Metering Infrastructure (AMI) helped in recording power profiles, generating analytical insights, and especially billing information, but has been limited in reporting asset degradation information using recorded data.

Besides, executing control commands through smart meters and the AMI network has several concerns regarding cyber-security. Several specialized sensors for asset monitoring have been introduced and deployed, but they tend to be expensive and highly specialized. They also require complex installation and commissioning processes—often with an expensive truck-roll to installation site. This makes the deployment of these specialized sensors very expensive and especially impractical at scale that is necessary to cover the vast, geographically dispersed electric distribution network. Consequently, utilities are forced operate the distribution network with limited visibility, only relying on the data reported by smart meters/AMI networks. As a result, the various distributed assets often go un-monitored and utilities are forced to adopt a run-to-failure approach for these assets.

As newer load types and DERs are deployed in the distribution network, another major challenge that utilities are facing is that of increased voltage volatility due to high penetration of roof top PV, reverse power flows etc. Some of the well-known issues are the rise in voltage when distributed PV production peaks, the high voltage drop due to peak power drawn by newer loads like EVs, improper operations of line voltage regulators due to reverse power flows or higher voltage fluctuations [See, H. Sun et al., "Review of challenges and research opportunities for voltage control in smart grids," in *IEEE Trans. on Power Systems*, vol. 34, no. 4, pp. 2790-2801 July 2019.].

To mitigate some of these issues, utilities have to rely on 'active' devices that can perform certain control actions. For instance, one method of overcoming voltage volatility issues is through distributed VAR controllers deployed on the feeder low-voltage (LV) side. These are devices that utilize power electronics-based solutions to inject reactive power into the LV side of a distribution transformer. These devices can be configured to regulate the voltage around a set-point and can perform the task of injecting appropriate amount of reactive power based on locally sensed parameters. Other applications include conservation voltage reduction (CVR)—i.e., minimizing end use voltage to reduce the peak demand, in order to realize potential energy savings.

It is evident that as newer load types and DERs get deployed into the power grid, the distribution network is getting transformed into an 'active' network that can be controlled dynamically through smart edge devices. It is therefore an underlying object of the present invention to provide a universal grid edge asset monitoring device with ubiquitous 5G network access.

BRIEF SUMMARY

An exemplary embodiment of the present disclosure provides a grid edge node, comprising a power supply, one or more sensors, a telecommunications radio, and a backhaul connection. The power supply can be configured to receive input power from a power transformer mounted to a utility pole. The one or more sensors can be configured to monitor one or more conditions of the power transformer. The telecommunications radio can be configured to transmit and receive wireless telecommunications signals to and from remote devices in a telecommunications network. The backhaul connection can be configured to provide communication between the grid edge node and a cloud-based monitoring system. The grid edge node can be configured to transmit data indicative of the one or more monitored conditions to the cloud-based monitoring system via the backhaul connection. The grid edge node can be further configured to be mounted to the utility pole.

In any of the embodiments disclosed herein, the grid edge node can further comprise a memory configured to store data indicative of the monitored one or more conditions.

In any of the embodiments disclosed herein, the one or more conditions of the power transformer can comprise one or more of faults, abnormal output voltages, output current of one or more phase legs of the transformer, vibration signatures of the transformer, temperature of the transformer, output power of the transformer, and tilting of the utility pole.

In any of the embodiments disclosed herein, the one or more conditions of the power transformer can comprise a voltage output, current output, and power factor of the power transformer.

In any of the embodiments disclosed herein, the one or more sensors can comprise one or more current sensors configured to monitor the output current of one or more phase legs of the transformer.

In any of the embodiments disclosed herein, the one or more current sensors can be configured as Rogowski coils.

In any of the embodiments disclosed herein, the Rogowski coils can be configured as clip-on Rogowski coils.

In any of the embodiments disclosed herein, the current sensors can be configured to adaptively modulate a gain to ensure that the measured current falls within a full dynamic range of the sensor's measurement.

In any of the embodiments disclosed herein, the one or more sensors can comprise a vibration sensor or accelerometer configured to monitor vibrations of the transformer.

In any of the embodiments disclosed herein, the one or more sensors can comprise a temperature sensor configured to monitor a temperature of one or more of a casing of the transformer or an oil temperature inside the transformer.

In any of the embodiments disclosed herein, the one or more sensors can comprise an acoustic sensor configured to monitor acoustics generated by the transformer.

In any of the embodiments disclosed herein, the telecommunications radio can comprise a 5G telecommunications radio configured to transmit and receive 5G wireless signals in the telecommunications network.

In any of the embodiments disclosed herein, the backhaul connection can be a fiber optic backhaul connection.

In any of the embodiments disclosed herein, the backhaul connection can be configured to provide communication between the telecommunications radio and one or more devices of the telecommunications network.

In any of the embodiments disclosed herein, the power supply can comprise a bidirectional power converter configured to receive power from the power transformer and provide power to the grid edge node.

In any of the embodiments disclosed herein, the bidirectional power converter can be further configured provide electrical power to an electric utility grid.

In any of the embodiments disclosed herein, the bidirectional power converter can be further configured as a reactive power injection system configured to inject active and/or reactive power to the electric utility grid.

In any of the embodiments disclosed herein, the bidirectional power converter can be further configured as a conservation voltage reduction system.

In any of the embodiments disclosed herein, the conservation voltage reduction system can comprise one or more capacitors configured to alter a voltage level output of the transformer.

In any of the embodiments disclosed herein, the power supply can further comprise a battery configured to provide backup power supply to the grid edge node when power is unavailable from the power transformer.

Another embodiment of the present disclosure provides a system, comprising a utility pole, a power transformer, a backhaul, and a grid edge node. The utility pole can service an electric utility grid and a telecommunications utility network. The power transformer can be mounted to the utility pole and configured to exchange electrical power between the utility grid and one or more electrical assets. The backhaul can provide communication access to the telecommunication utility network. The grid edge node can be mounted to the utility pole and configured to monitor one or more conditions of the power transformer and to transmit and receive wireless telecommunications signals to and from remote devices utilizing the telecommunications utility network.

In any of the embodiments disclosed herein, the grid edge node can comprise a power supply, one or more sensors, a telecommunications radio, and a backhaul connection. The power supply can be configured to receive input power from the power transformer. The one or more sensors can be configured to monitor the one or more conditions of the power transformer. The telecommunications radio can be configured to transmit and receive the wireless telecommunications signals to and from the remote devices. The backhaul connection can be connected to the backhaul and configured to provide communication between the grid edge node and a cloud-based monitoring system. The grid edge node can be configured to transmit data indicative of the one or more monitored conditions to the cloud-based monitoring system via the backhaul connection.

In any of the embodiments disclosed herein, the backhaul can be a fiber optic backhaul.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1:
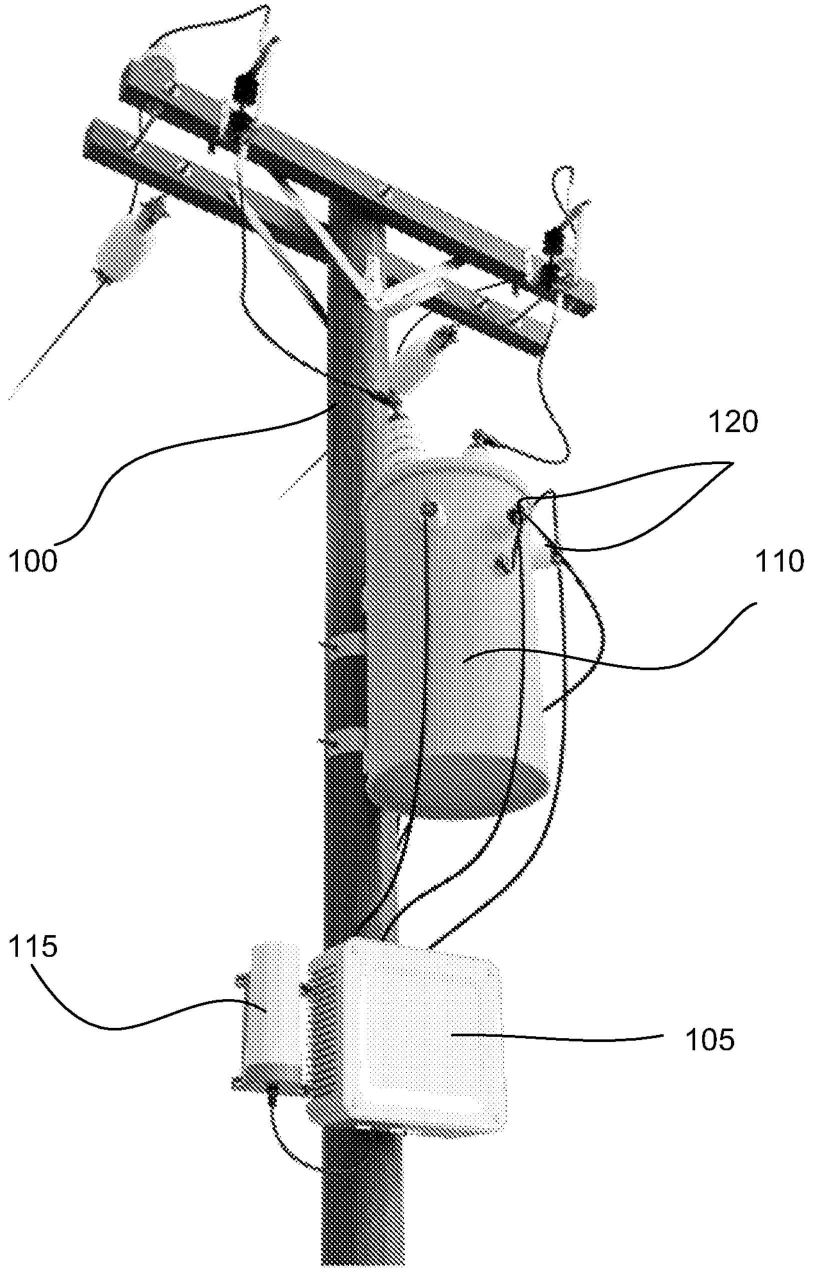
FIG. 1 is a schematic illustrating a grid edge node mounted to an electric utility pole as part of a utility grid, in accordance with some embodiments of the present disclosure.

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

As used in the specification and the appended Claims, the singular forms "a," "an" and "the" include plural references unless the context clearly dictates otherwise. For example, reference to a component is intended also to include a composition of a plurality of components. References to a composition containing "a" constituent is intended to include other constituents in addition to the one named.

In describing exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed as from "about" or "approximately" or "substantially" one value and/or to "about" or "approximately" or "substantially" another value. When such a range is expressed, other exemplary embodiments include from the one value and/or to the other value.

Similarly, as used herein, "substantially free" of something, or "substantially pure", and like characterizations, can include both being "at least substantially free" of something, or "at least substantially pure", and being "completely free" of something, or "completely pure".

"Comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is evident that as newer load types and DERs get deployed into the power grid, the distribution network is getting transformed into an 'active' network that can be controlled dynamically through smart edge devices. Besides, the growth of grid-connected power electronics can help in achieving greater controllability across the network. Newer converters and topologies (e.g.,—the S4T power converter [See, H. Chen and D. Divan, "Soft-Switching Solid-State Transformer (S4T)," in IEEE Trans. on Power Electronics, vol. 33, no. 4, pp. 2933-2947 April 2018.] and [See, A. Marellapudi, M. J. Mauger, P. Kandula, D. Divan, "Enabling high efficiency in low-voltage soft-switching current source converters," in Proc. IEEE Energy Conversion Congress and Exposition, 2020, pp. 3456-3463.]) enabling multi-port configurations and battery integration help in participating in various grid interactive and grid support activities.

There is a clear need for networked smart devices that can perform sensing as well as control functions while residing at the edge of the power grid. From the point of view of operational and capital expenditures, minimizing truck rolls while simultaneously deploying intelligent, highly flexible infrastructure across the different neighborhoods, that can serve multiple purposes for the same cost is an attractive prospect. With both the electric utilities as well as and telecommunication service providers benefitting from infrastructure deployments in the “last mile distribution networks,” there exists an opportunity to develop flexible edge devices that can solve the problems faced by both the industries. These flexible infrastructure elements, once deployed, can form the backbone of both the electric distribution network as well as the 5G RAN.

The present disclosure builds a business model where the electric utility rolls out and deploys the infrastructure including the utility poles and related components. This infrastructure can be used to locate flexible nodes (as disclosed herein) that can be used by the telecommunication partners to provide services and 5G network access capabilities, by utilizing the same capital investment. The nodes can be used by both the electric utility for asset monitoring and network management, as the nodes can also host a power converter that can support the electric grid when needed. At the same time, the nodes can provide services like access to high-speed fiber-optic backhaul that can be used for providing 5G network access by telecommunication service providers.

The present disclosure aims to utilize existing utility infrastructure to deploy devices near grid assets and the gird edge to minimize capital and operational expenditures. This enables the build-out and operation of flexible grid monitoring and utility services infrastructure. At the heart of this approach is an intelligent “Grid Edge Node” (or GEN for short). As used herein, the term grid edge node or GEN refers to any device that can be used to control and/or monitor one or more components and/or aspects of an electrical and/or telecommunications distribution network. As described herein, the GENs of the present disclosure can have one or more features/components that enable the devices to serve both the electric utility and telecommunications networks. This allows the system operators to utilize the same device for multiple services including grid management functions like grid and asset monitoring, advanced visibility and situational awareness, decentralized control to name a few, as well as functions related to telecommunication services like 5G wireless access.

One of the innovative features of the present disclosure lies in co-locating a single device that has access to both the electric utility as well as the telecom domains on the electric utility pole and can offer multiple services across both domains. Indeed, as shown in FIG. 1, an exemplary embodiment of the present disclosure provides a GEN 105 that can be mounted to an electric utility pole 100 supporting an electric power transformer 110. In accordance with various embodiments of the present disclosure, the GEN 105 can be mounted to the electric utility pole at various locations on the pole.

Figure 2:
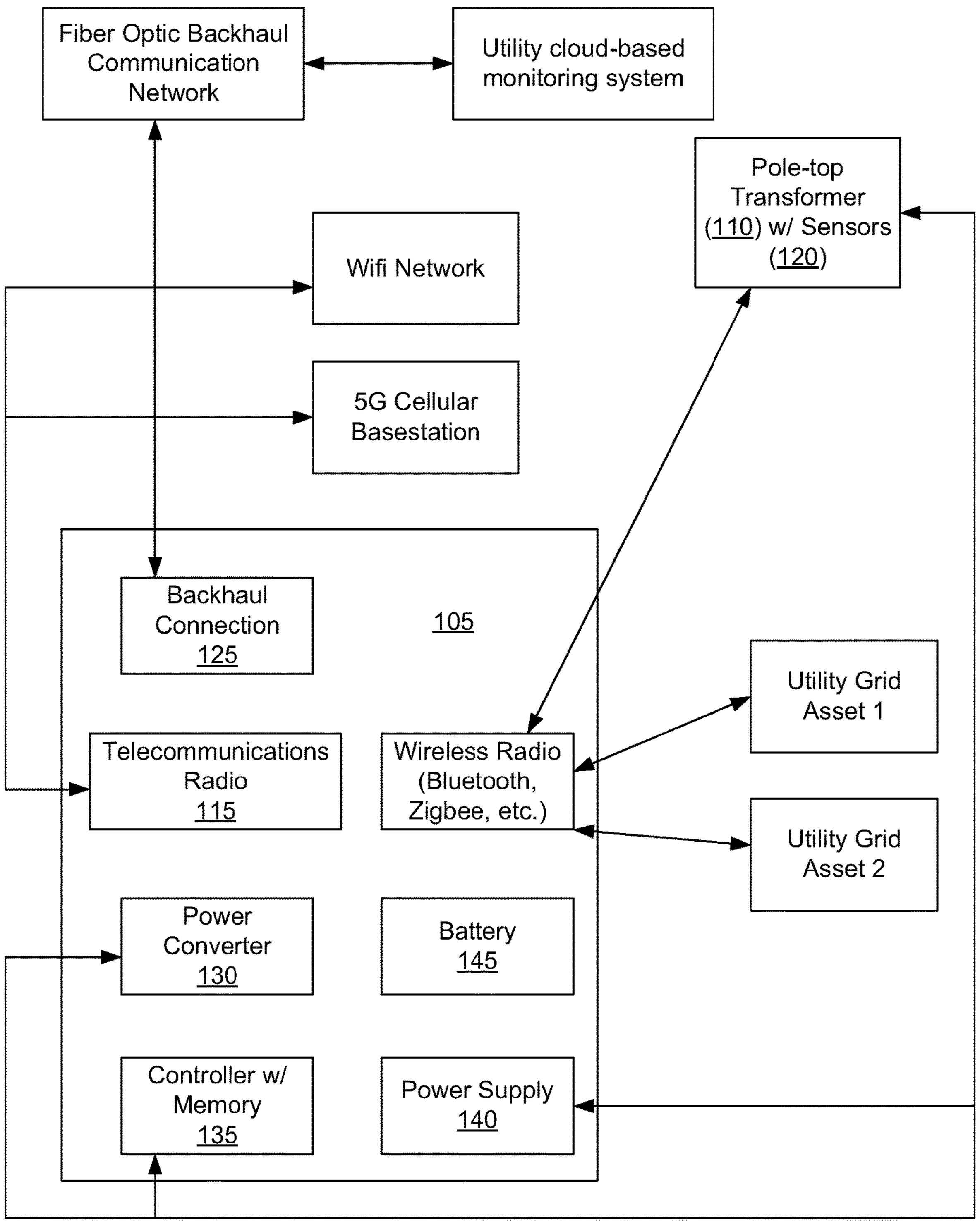
FIG. 2 is a provides a block diagram of a grid edge node, in accordance with some embodiments of the present disclosure.

As shown in FIGS. 1-2, the GEN 105 can comprise one or more sensors 120. These sensors 120 can be placed at the transformer (as shown in FIG. 1), for example, when certain parameters associated with the transformer are to be monitored. The disclosure, however, is not so limited. Rather, the one or more sensors can be located at various locations to monitor various conditions associated with many conditions of the electric grid, telecommunications network, or assets of either. The inventors have been developing solutions for monitoring and controlling assets in the power grid, through a fleet of low-cost, intelligent edge nodes and a platform called GAMMA. The platform is designed for asset monitoring, management and performing control actions based on locally sensed parameters. One of the applications supported by GAMMA platform is a modular smart energy meter, such as the GEN devices 105 disclosed herein, that can interface with additional sensors (e.g., a vibration sensor, temperature sensors etc.) and can be configured to record these parameters of interest as they relate to a transformer’s 110 degradation cycle. The sensors 120 can be many different sensors known in the art, including, but not limited to, voltage sensors, current sensors, power sensors, accelerometers, vibration sensors, temperature sensors, acoustic sensors and the like. The sensors 120 can be used to monitor and record anomalies like faults, abnormal voltages, various currents (e.g., transformer output currents at one or more phase legs), vibration signatures, temperature of the transformer (casing and/or internal oil temperature), various voltages (e.g., transformer output voltage at one or more legs), transformer power factor, output power of the transformer, pole tilts, and the like, and can locally store and analyze these various parameters/conditions. These recorded metrics can be used to rank the performance of transformers over time and across a fleet, to generate alerts and notifications for utility operators.

In some embodiments, the one or more sensors 120 can comprise a non-invasive, intelligent current sensor that can adaptively modulate its dynamic range, such that it accurately measures the current flowing through the conductor of interest. This concept utilizes a prior invention that concerns a clip-on Rogowski coil based universal current sensor, which are disclosed in PCT Patent App. No. PCT/US2020/044007, which is incorporated herein by reference in its entirety as if fully set forth below. The Rogowski coil current sensor can be operated across a wide range of current levels. The Rogowski coil can operate in a non-intrusive manner as the sensor can be clipped onto the conductor, without the need to disconnect the conductor. This approach allows the same sensor to be utilized across a variety of different applications and current ranges, without the need for additional customization. This method allows for the design of low-cost, modular sensors that can be incorporated into devices that interface with assets on the electric grid.

The present disclosure provides embodiments that build additional functionality on top of the smart sensors for grid monitoring. Due to the modular and non-intrusive nature of the sensors, they can be fully integrated with devices that can offer additional services like providing telecommunication radio network access. This is possible due to the co-existence of fiber-optic network in the telecommunication domain of the electric utility pole. The existing fiber optic backhaul can provide a dedicated path with high bandwidth for device to cloud communication. This channel can be leveraged for two purposes—connecting the GEN device 105 to proprietary cloud (e.g.,—GAMMA cloud or utility backend infrastructure) as well as for providing high speed radio access for wireless devices through 5G networking.

Thus, the GEN device 105 can combine a smart, grid monitoring sensor capable of advanced analytics with a telecommunications radio 115. The telecommunications radio 115 can be many different wired or wireless transceivers/radios known in the art. In some embodiments, the telecommunications radio 115 can act like a 5G RAN device due to the proximity and access to the fiber optic network as well as the electric distribution feeder network. This allows a single GEN 105 to be used for both value streams—offering a unified approach for both grid edge monitoring as well as ubiquitous, fast, 5G radio networking. Co-locating the units near assets like pole-top transformer 110 deployed in the electric utility distribution network can help in monitoring these un-monitored assets, while simultaneously doubling up as telecommunication infrastructure—without the need for additional capital investment.

The telecommunications radio 115 can be configured to transmit and receive wired and/or wireless signals to and from remote devices in the telecommunications network. For example, the telecommunications radio 115 can provide communication between cellular telephones and the telecommunications network. In some embodiments, the telecommunications radio 115 can include a Wifi router that can provide a "public" (or "private") Wifi hotspot. The telecommunications radio 115 can also communicate wirelessly with a cellular base station (e.g., a 5G base station). The telecommunications radio 115 can offer significant advantages to the telecommunications utility when it comprises a 5G radio capable of providing 5G cellular service (as understood by a person of ordinary skill in the art in view of IEEE, 3GPP, and ORAN standards).

As shown in FIG. 2, the GEN 105 can further comprise a backhaul connection 125. The backhaul connection can provide the GEN 105 with access to a backhaul communication line of the electric utility and/or the telecommunications network. For example, the telecommunications network can comprise a fiber optic backhaul and the backhaul connection 125 can allow communications between the GEN 105 and remote devices over the fiber optic backhaul. In some embodiments, as shown in FIG. 2, the GEN can use the backhaul connection 125 to communicate with a cloud-based monitoring system of the electric utility over the backhaul.

As shown in FIG. 2, the GEN 105 can further comprise a controller and memory 135 for controlling the GEN and receiving and storing data from the sensors/etc. indicative of the monitored conditions. The controller 135 can then use, for example, the backhaul connection 125, to transmit the data to a cloud-based monitoring/controlling system.

In some embodiments, the GEN device 105 can include a power supply 140. The power supply 140 can provide power to the GEN 105 that is received from the power transformer 110. In some embodiments, the power supply 140 can comprise an integrated battery 145 that helps in operating through outages (i.e., when power is unavailable from the power transformer) and alerting the operators about ongoing blackouts.

The GEN devices 105 can offer additional functionality and capabilities by including a power electronics-based converter 130. In some embodiments, the GEN device 105 can host a bi-directional power converter 130 front end interfaced with the grid connected side, that is capable of drawing power from the grid and/or injecting power back into the grid. In some embodiments, the converter 130 can transform the LV AC power input available from the transformer 110 (e.g., power supply 140) to a DC voltage level that is compatible with low voltage embedded electronics (e.g., a 12/24/48 V DC rail to power up the sensor and other electronics).

Additionally, a battery 145 with a bi-directional power supply can be integrated into the GEN 105 to interface with the low voltage DC bus. This can enable the GEN 105 to operate at times when there are outages in the network and the input power drops off. Thus, even during outages, the access to the 5G network can be maintained through battery power for all downstream networked devices. Through the fiber-optic backhaul network, the electric utility operators can also get real-time visibility into the distribution network performance during outages. This adds to the capability of traditional electric utility outage management systems. The battery 145 can also help in regulating the power drawn by the RAN elements that provide 5G network access. Thus, instead of the pulsed 2 kWpk power drawn from the grid with a 5-10% duty cycle, the converter can flatten the demand to a relatively constant power draw (e.g., 200 W). This can help in mitigating some of the issues caused by the pulsed power load and the GEN device can essentially appear as a constant load on the distribution feeder.

In some embodiments, the power electronics converter 130 can actively interact with the grid and perform activities to dynamically support the grid functions. For instance, the built-in battery 145 can be used to provide dynamic active and reactive power support for the grid during grid transients, providing transient inertia and volt-VAR support.

Using the power electronics-based interface, in some embodiments, the GEN device 105 can draw power from the grid to support grid monitoring and telecom operations, as well as inject power back into the grid to support the grid when needed. The injected power can be reactive power (i.e., VARs) that can help stabilize the power and voltage profiles along the feeder in a distributed manner. Thus, the GEN device 105 can behave like a LV VAR controller, located throughout the distribution network—for instance on each transformer in the network. By way of example, if a feeder has 5 MW of peak capacity with 500 distribution pole-top transformers located across the network, there are 500 possible locations where the GENs can be installed.

For example, if each GEN 105 is capable of injecting approximately 2 kVAR (as an example) of reactive power, the system together allows the feeder to access 1 MVARs of distributed volt-VAR control (VVC) throughout the system for a certain amount of time, allowing dynamic corrections grid voltage profiles when needed. With tight voltage regulation and VVC at each transformer 110, the upstream LTCs can be switched less frequently, which reduces the wear and tear that they undergo, especially in feeders with heavy DER and PV penetration. The distributed VVC can also help in improving the power factor at each transformer and help in achieving conservation voltage reduction (CVR) (e.g., through the use of capacitive networks) in a distributed manner and realize potential energy savings.

With a connected, 'online', intelligent sensor system (hosted inside GEN 105) distributed throughout the electric feeder, utility operators can obtain a steady stream of data reported back to their backend systems. The parameters monitored at each GEN 105 can include voltage, current, power and power factor, along with other metrics of interest relevant for asset monitoring. The communication back to the cloud interface can utilize the fiber-optic or other backhaul connectivity option that is available for the GEN 105, thus not needing any additional customization and configuration effort. With the distributed sensors 120, the utility operators can get insight into the asset degradation processes at each installed location.

Additionally, advanced capabilities from fleet-level aggregation and monitoring include the ability to map out and verify the feeder connectivity models, generate heat maps using geographical information based on real time data and alerts, identify areas with poor voltage profiles or power factor issues, and the like. Moreover, with the sensors 120 capable of capturing data at a high sampling rate, waveforms and other trends can be made available for post-event diagnostic purposes.

Figure 3:
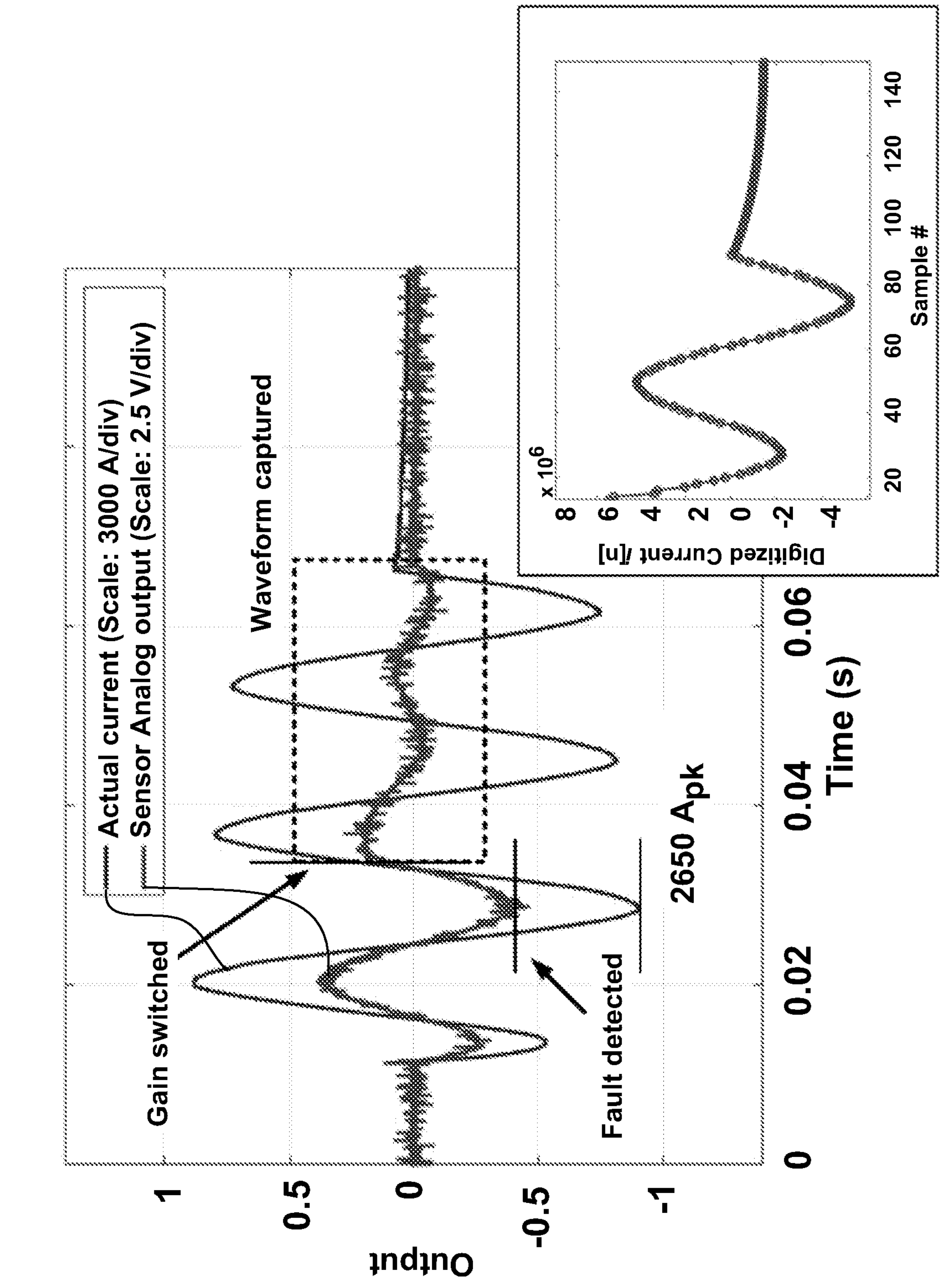
FIG. 3 is a graph of the waveform of a 2650 $A_{pk}$ fault observed on a pole-top distribution transformer captured through a grid edge node of the present disclosure, in which the inset graph shows the digitized waveform.

For instance, with the embodiments disclosed herein, it is possible for the sensor 120 to intelligently identify and capture downstream faults and related waveforms as shown in FIG. 3. These waveforms can be used for post-processing and accessing detailed information when performing troubleshooting or root-cause analysis. This feature can help in recording and analyzing power quality (PQ) disturbances like voltage sags, swells, harmonic distortion etc.

The combination of sensor-driven computations on locally recorded data, as well as cloud-driven computations based on data recorded across different sensors in a distribution feeder can help in obtaining greater visibility and situational awareness across the feeder system. The overall platform (GEN+backend system) can record and analyze time-stamped vibration, voltage, and power consumption profiles and detect the operation of downstream EV charging stations and roof-top PV inverters. The patterns and trends can be used for detecting degradations and changes in the performance of assets (e.g.,—pole-top transformers). The real-time information can also help in generating time-varying trends of electrical quantities like voltage, power flows, etc., on geographic information systems (GIS). The time varying electrical quantities can also help in determining the electrical system topology and connections, helping in correcting any potential errors in the electrical utility provider's databases.

The GEN device 105 can also be used as the electric utility's grid edge management device—a device that can act as a communications hub/gateway for other distribution grid assets like smart meters, other sensors, etc., located in the vicinity. The device-to-device communication can occur through radio communication—e.g., Bluetooth, Zigbee, Z-Wave, Wi-Fi, LoRa, etc., as shown in FIG. 2.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A grid edge node comprising:

one or more sensors;

wherein:

the grid edge node is configured to:

interface with one or more grid assets of a power grid and one or more telecommunication assets of a telecommunications network;

monitor one or more conditions of one or more of the grid assets with one or more of the sensors; and provide wireless communication infrastructure to the telecommunications network; and one or more of the sensors is a current sensor configured to adaptively modulate a dynamic current sensing range.

2. The grid edge node of claim 1 further comprising:

a memory configured to store data indicative of one or more of the monitored conditions; and a backhaul connection configured to provide communication between the grid edge node and a cloud-based monitoring system;

wherein the grid edge node is further configured to transmit data indicative of one or more of the monitored conditions to the cloud-based monitoring system via the backhaul connection.

3. The grid edge node of claim 1 further comprising:

a power supply comprising a bidirectional power converter configured to:

receive input power from one of the grid assets comprising a power transformer configured to be mounted to a utility pole; and provide power to the grid edge node; and a backhaul connection configured to provide communication between the grid edge node and a cloud-based monitoring system;

wherein:

the grid edge node is further configured to:

transmit data indicative of one or more conditions of the power transformer to the cloud-based monitoring system via the backhaul connection; and be mounted to the utility pole upon which the power transformer is mounted; and one or more of the conditions of the power transformer is selected from a group consisting of faults, abnormal output voltages, output current of one or more phase legs of the power transformer, vibration signatures of the power transformer, temperature of the power transformer, output power of the power transformer, tilting of the utility pole, a voltage output of the power transformer, a current output of the power transformer, and a power factor of the power transformer.

4. The grid edge node of claim 1 further comprising:

a 5G telecommunication radio access point configured to transmit and receive 5G wireless signals in the telecommunication network and provide 5G base station or access point service to one or more of the telecommunication assets; and a backhaul connection configured to provide communication between the grid edge node and a cloud-based monitoring system;

wherein the grid edge node is further configured to transmit data indicative of one or more conditions of the one or more of the grid assets to the cloud-based monitoring system via the backhaul connection.

5. The grid edge node of claim 4 further comprising:
a power supply comprising a bidirectional power converter configured to:
receive input power from one of the grid assets comprising a power transformer configured to be mounted to a utility pole; and
provide power to the grid edge node;
wherein:
the grid edge node is further configured to transmit data indicative of one or more conditions of the power transformer to the cloud-based monitoring system via the backhaul connection; and
the grid edge node is further configured to be mounted to the utility pole upon which the power transformer is mounted.

6. The grid edge node of claim 1, wherein:
a first one of the one or more of the sensors is the current sensor configured to adaptively modulate a dynamic current sensing range; and
a second one of the one or more of the sensors is a current sensor configured as a Rogowski coil.

7. The grid edge node of claim 6, wherein the Rogowski coil is configured as clip-on Rogowski coil.

8. The grid edge node of claim 1, wherein:
a first one of the one or more of the sensors is the current sensor configured to adaptively modulate a dynamic current sensing range; and
a second one of the one or more of the sensors is selected from a group consisting of a vibration sensor configured to monitor vibrations of one or more of the grid assets, an accelerometer configured to monitor vibrations of one or more of the grid assets, a temperature sensor configured to monitor a temperature of a casing of one or more of the grid assets, a temperature sensor configured to monitor a temperature of an oil temperature inside one or more of the grid assets, and an acoustic sensor configured to monitor acoustics generated by one or more of the grid assets.

9. The grid edge node of claim 1 further comprising;
a telecommunications radio configured to transmit and receive wireless telecommunications signals to and from one or more of the telecommunication assets;
wherein the telecommunications radio is a 5G telecommunications radio configured to transmit and receive 5G wireless signals in the telecommunications network.

10. The grid edge node of claim 1 further comprising:
a backhaul connection configured to provide communication between the grid edge node and a cloud-based monitoring system;
wherein the backhaul connection is a fiber optic backhaul connection.

11. The grid edge node of claim 1 further comprising:
a telecommunications radio configured to transmit and receive wireless telecommunications signals to and from one or more of the telecommunication assets; and
a backhaul connection configured to provide communication between:
the grid edge node and a cloud-based monitoring system; and
the telecommunications radio and one or more of the telecommunication assets of the telecommunications network.

12. A grid edge node comprising:
a power supply comprising a bidirectional power converter;
wherein:
the grid edge node is configured to:
interface with one or more grid assets of a power grid and one or more telecommunication assets of a telecommunications network;
monitor one or more conditions of one or more of the grid assets; and
provide wireless communication infrastructure to the telecommunications network; and
the bidirectional power converter is configured to at least one of:
provide electrical power to the power grid comprising an electric utility grid;
inject active and/or reactive power to the power grid comprising an electric utility grid; or
alter a voltage level output of one or more of the grid assets.

13. The grid edge node of claim 12, wherein the power supply further comprises a battery configured to provide backup power supply to the grid edge node when power is unavailable from one or more of the grid assets.

14. A grid edge node configured to:
interface with one or more grid assets of a power grid and one or more telecommunication assets of a telecommunications network;
monitor one or more conditions of one or more of the grid assets;
provide wireless communication infrastructure to the telecommunications network; and
at least one of:
communicate with one or more of the grid assets comprising electric utility grid assets via an encrypted communication channel over the telecommunications network comprising a wireless network;
transmit information received from the grid assets comprising electric utility grid assets to a cloud-based monitoring system; or
function as a gateway for a mesh network of one or more of the telecommunication assets, wherein the grid edge node is further configured as a node in the mesh network.

15. A system comprising:
the grid edge node of claim 1, 12 or 14; and
a utility pole servicing the power grid comprising an electric utility grid and the telecommunications network comprising a telecommunications utility network;
wherein:
at least one of the one or more grid assets comprises a power transformer mounted to the utility pole and configured to exchange electrical power between the electric utility grid and at least one other of the one or more grid assets each comprising an electrical asset; and
the grid edge node is mounted to the utility pole and is further configured to:
monitor one or more conditions of the power transformer; and
transmit and receive wireless telecommunications signals to and from one or more of the telecommunication assets comprising remote devices utilizing the telecommunications utility network.

16. A system comprising:
a grid edge node configured to:
interface with one or more grid assets of an electric power grid and one or more telecommunication assets of a telecommunications utility network;

monitor one or more conditions of one or more of the grid assets;

provide wireless communication infrastructure to the telecommunications utility network; and transmit and receive wireless telecommunications signals to and from one or more of the telecommunication assets comprising remote devices utilizing the telecommunications utility network;

a utility pole servicing the electric power grid;

a power supply comprising a bidirectional power converter configured to:

receive input power from at least one of the one or more grid assets comprising a power transformer mounted to the utility pole; and provide power to the grid edge node;

one or more sensors configured to monitor one or more of the conditions of the power transformer;

a telecommunications radio configured to transmit and receive the wireless telecommunications signals to and from the remote devices; and a backhaul connection connected to a backhaul providing communication access to the telecommunication utility network, the backhaul connection configured to provide communication between the grid edge node and a cloud-based monitoring system;

wherein the grid edge node is further configured to transmit data indicative of one or more of the monitored conditions to the cloud-based monitoring system via the backhaul connection.

17. A system comprising:

a utility pole servicing an electric utility grid and a telecommunication utility network;

a power transformer mounted to the utility pole and configured to exchange electrical power between the electric utility grid and one or more electrical assets; and a grid edge node mounted to the utility pole and configured to:

monitor one or more conditions of the power transformer; and transmit and receive wireless telecommunication signals to and from remote devices utilizing the telecommunication utility network;

wherein the grid edge node comprises a power supply comprising a bidirectional power converter configured to:

receive input power from the power transformer; and provide power to the grid edge node.

18. The system of claim 17, wherein the grid edge node further comprises:

one or more sensors configured to monitor the one or more conditions of the power transformer;

a 5G telecommunication radio access point configured to transmit and receive 5G wireless signals in the telecommunication utility network and provide 5G base station or access point service to the remote devices; and a backhaul connection connected to a backhaul providing communication access to the telecommunication utility network, the backhaul connection configured to provide communication between the grid edge node and a cloud-based monitoring system;

wherein the grid edge node is configured to transmit data indicative of the one or more monitored conditions to the cloud-based monitoring system via the backhaul connection.

19. The system of claim 18, wherein at least one of:

the one or more current sensors are configured as Rogowski coils;

the one or more current sensors are configured as clip-on Rogowski coils;

the one or more current sensors are configured to adaptively modulate a gain to ensure that a measured current falls within a full dynamic range of a measurement of one or more of the sensors;

the backhaul is a fiber optic backhaul;

the backhaul connection is further configured to provide communication between the 5G telecommunication radio access point and one or more of the remote devices;

the bidirectional power converter is further configured provide electrical power to the electric utility grid;

the bidirectional power converter is further configured as a reactive power injection system configured to inject active and/or reactive power to the electric utility grid;

the bidirectional power converter is further configured as a conservation voltage reduction system; or the power supply further comprises a battery configured to provide backup power supply to the grid edge node when power is unavailable from the power transformer.

* * * * *